United States Patent [19]

Lewis

[11] Patent Number: 4,501,942
[45] Date of Patent: Feb. 26, 1985

[54] METHOD AND APPARATUS FOR UNIFORM INDUCTION HEATING OF AN ELONGATED WORKPIECE

[75] Inventor: John C. Lewis, Dundas, Canada

[73] Assignee: Park-Ohio Industries, Inc., Shaker Heights, Ohio

[21] Appl. No.: 416,274

[22] Filed: Sep. 9, 1982

[51] Int. Cl.³ .............................................. H05B 6/40
[52] U.S. Cl. ............................... 219/10.43; 219/10.57; 219/10.71; 219/10.77
[58] Field of Search ............... 219/10.43, 10.41, 10.57, 219/10.69, 10.71, 10.77, 10.75, 10.49 R; 266/129, 124; 148/146, 154, 150

[56] References Cited

U.S. PATENT DOCUMENTS

| | | | |
|---|---|---|---|
| 2,490,104 | 12/1949 | Strickland | 219/10.57 |
| 3,743,808 | 7/1973 | Kasper | 219/10.77 |
| 4,418,259 | 11/1983 | Lewis | 219/10.43 |
| 4,420,667 | 12/1983 | Lewis | 219/10.77 X |
| 4,433,226 | 2/1984 | Wagar | 219/10.77 X |
| 4,442,331 | 4/1984 | Watanabe | 219/10.43 |

FOREIGN PATENT DOCUMENTS

| | | |
|---|---|---|
| 1508430 | 10/1969 | Fed. Rep. of Germany . |
| 1533955 | 2/1970 | Fed. Rep. of Germany . |
| 2801661 | 2/1979 | Fed. Rep. of Germany . |
| 815003 | 7/1937 | France . |
| 1557249 | 1/1969 | France . |
| 2360674 | 3/1978 | France . |

*Primary Examiner*—Philip H. Leung
*Attorney, Agent, or Firm*—Body, Vickers & Daniels

[57] ABSTRACT

Method and apparatus for uniformly heating a workpiece such as a sucker rod or the like having a uniform cross-section over a major portion of its length and an enlargement adjacent each end thereof. A multi-turn inductor is coaxially disposed around a portion of an elongated workpath with the rod being longitudinally moved at some preselected rate of travel along the workpath toward the inductor entrance end. The inductor is normally at a first level of energization adapted to inductively heat the rod major portion to some predetermined temperature as it passes through the inductor. Sensing a preselected power absorption level by the rod as the enlargement adjacent the leading end is inductively coupled with the inductor causes the inductor to be automatically placed at a second, higher level of energization for heating the enlargement to the predetermined temperature. The inductor then automatically returns to the normal level of energization after some predetermined time interval for inductively heating the rod major portion. As the enlargement adjacent the rod trailing end is placed in an inductively coupled relationship with the inductor, the predetermined power absorption level increase is again sensed and the inductor is automatically switched to the higher level of energization. The inductor energization levels and the power absorption level sensing capabilities are adjustable to accommodate different rod and feed characteristics.

16 Claims, 3 Drawing Figures

METHOD AND APPARATUS FOR UNIFORM INDUCTION HEATING OF AN ELONGATED WORKPIECE

BACKGROUND OF THE INVENTION

This invention relates to the art of induction heating and, more particularly, to method and apparatus for uniformly heating an elongated workpiece having a uniform cross-section over the major portion of its length with at least one enlargement disposed therealong.

The invention is particularly applicable to heating sucker rods which are employed in oil wells and the like and will be described with particular reference thereto. However, it will be appreciated that the invention has broader applications and may be used for inductively heating a variety of elongated workpieces having one or more areas of enlarged cross-section disposed therealong.

Sucker rods are utilized in the petroleum industry as a connecting length between a down hole oil well pump and the lifting or pumping device on the surface. Each rod is quite long, e.g., approximately 25–30 feet. A major portion of the rod has a uniform cross-section with an enlargement included adjacent each end thereof. These enlargements variously facilitate interconnecting a plurality of the rods in an end-to-end relationship. While there are a number of specific or detailed modifications which may be included in the sucker rod configurations of different manufacturers, almost all such rods have the foregoing general conformation and characteristics.

One of the manufacturing steps typically requires that sucker rods be heated to some predetermined temperature prior to passing through a subsequent processing operation. Such subsequent operations typically comprise an electrostatic spray chamber for having a coating of paint or plastic-like material applied to the rods. Since the rods need only be surface-heated for this purpose, induction-type heating finds particular advantage in this environment. However, because sucker rods do not have uniform cross-sections throughout the entirety of their lengths, it is necessary to in some way compensate for heating variations which otherwise would occur at the rod enlargement areas. Unless each rod is heated to a uniform temperature over the entire length, a subsequent processing operation may not be as effective as required. This is particularly true where a paint or plastic-like coating is to be applied.

A number of different arrangements to compensate for the above noted difficulty have previously been proposed, developed, and attempted. Two such arrangements are disclosed in the commonly assigned U.S. patent application Ser. Nos. 294,932 (filed Aug. 21, 1981) and 320,550 (filed Nov. 12, 1981). These two arrangements utilize variations in the inductor energization levels for different areas or sections of a workpiece, in particular, a sucker rod. While substantially improving the ability to uniformly heat workpieces of the type herein involved, these specific prior arrangements rely heavily on timers or other external sensing means for monitoring workpiece movement along a workpath and into an inductively coupled relationship with an inductor. Reliance on such external sensing means can result in some degree of workpiece heating variations due to problems in accurately determining the moment to effect an energization level change and/or due to inconsistencies in the workpiece feed rate.

It has, therefore, been considered desirable to develop an improved method and apparatus which will more reliably assure uniform induction heating of sucker rods and other workpieces of the general type described. The subject invention is deemed to meet these needs. Moreover, the invention is equally applicable to use in tempering, case hardening, through hardening, and normalizing of sucker rods or other workpieces.

BRIEF SUMMARY OF THE INVENTION

The present invention relates to inductively heating an elongated metal workpiece to a generally uniform temperature over the entire workpiece length and where the workpiece includes at least one area of enlarged cross-section. The invention utilizes pre-selected variations in the energization level of the inductor for heating different areas or sections of the workpiece. The power absorption level caused by passage of the workpiece through the inductor at one level of inductor energization is continuously monitored. When a power absorption level of some predetermined amount is sensed as a function of a particular area of the workpiece being inductively coupled with the inductor, the inductor energization level is automatically changed. The invention is particularly adapted for use in heating sucker rods of the type employed in the petroleum industry.

According to the invention, the method comprises the steps of:

(a) providing a multi-turn inductor having an entrance end and an exit end with the inductor being generally coaxially disposed about an elongated workpart;

(b) moving at least one of the inductor and workpiece relative to the other along the workpath with consecutive sections of the workpiece and inductor disposed in an inductively coupled relationship for heating the workpiece;

(c) causing the inductor to be energized to a preselected first level at least during the step of feeding for inductively heating one portion of the workpiece to generally a preselected temperature as it passes through the inductor;

(d) sensing changes in operating parameters of the inductor as another portion of the workpiece is moved into an inductively coupled relationship therewith; and, (e) changing the energization level of the inductor to a predetermined second level different from the first level in response to sensing a predetermined change in said operating parameters for inductively heating the another portion to generally the preselected temperature as it passes through the inductor.

In accordance with another aspect of the invention, the method includes the step of returning the inductor to the first level of energization following the step of changing.

In accordance with a further aspect of the invention, the step of returning occurs at some preselected position of the workpiece during the step of feeding. In the preferred method, returning occurs at some preselected time interval following the step of changing.

According to yet another aspect of the invention, the step of sensing comprises detecting a preselected change in the power absorption level caused by inductive coupling between the workpiece and inductor during the step of feeding. The step of detecting further includes creating a signal for initiating the step of changing.

According to a still further aspect of the present invention, apparatus is provided for inductively heating an elongated workpiece with a multi-turn induction heating coil having an entrance end, an exit end, and an elongated receiving passageway. The workpiece has two enlarged end portions separated by an elongated body portion having a generally uniform cross-section wherein uniform heating requires heating of the end portions with a first power level at a given feed rate and heating of the body portion with a second power level at the same feed rate. The apparatus is comprised of a power supply connected to the heating coil and having an output power shiftable between the first and second levels. Conveying means conveys the workpiece through the passageway at the feed rate along a workpath from the coil entrance end to the exit end with one of the workpiece end portions comprising a leading end and the other comprising a trailing end. A sensing means creates a signal as an operational parameter of the inductor reaches a predetermined level when one of the enlarged end portions is inductively coupled with the inductor. Means responsive to the signal automatically causes a shift from the first to the second power level. A return means thereafter moves the power level from the second back to the first level.

The principal object of the invention is the provision of improved method and apparatus for inductively heating an elongated workpiece to a generally uniform temperature where at least one enlargement is included along the workpiece length.

Another object of the invention resides in such method and apparatus for use in uniformly heating a sucker rod.

Still another object of the invention is the provision of improved method and apparatus for uniformly heating an elongated workpiece wherein the workpiece heating levels and feed parameters may be adjusted to accommodate a variety of workpiece conformations and heating results.

A further object of the invention is the provision of an induction heating method and apparatus which more reliably obtains uniform heating and utilizes an operational parameter of the inductor for triggering a change in the inductor energization level.

Still further objects and advantages of the invention will become readily apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in the following specification and illustrated in the accompanying drawings which form a part hereof and wherein.

DETAILED DESCRIPTION OF THE PREFERRED EMBODIMENT

Figure 1:
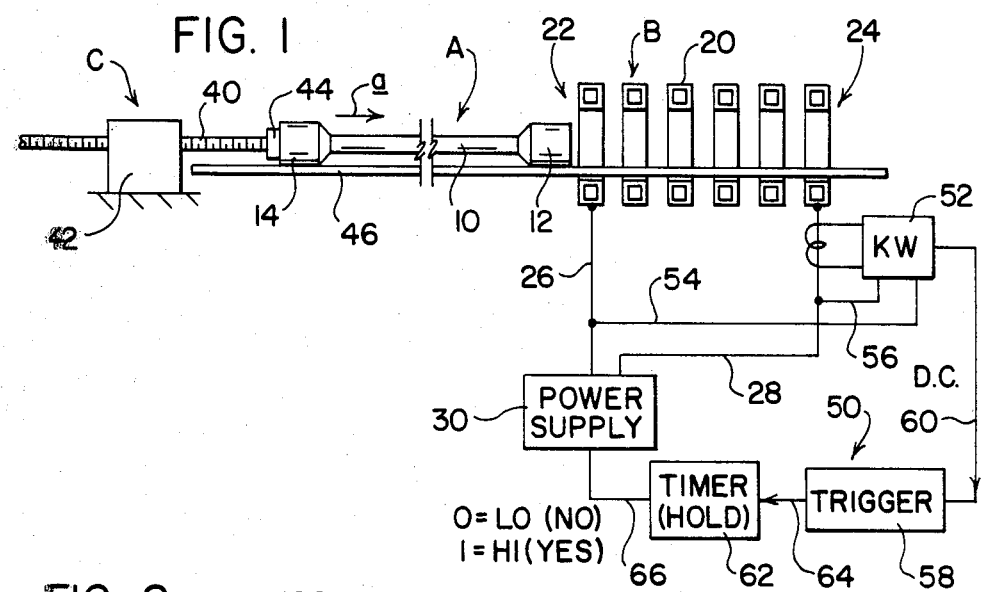
FIG. 1 is a generally schematic side elevational view of apparatus employed in practicing the invention along with a schematic control circuit utilized for automatically controlling the inductor energization level.

Referring now to the drawings wherein the showings are for purposes of illustrating the preferred embodiment of the invention only and not for purposes of limiting same, FIG. 1 shows an elongated sucker rod A operatively disposed relative to an induction heating apparatus B and being moved toward the heating apparatus by a feed mechanism C. It is desired to uniformly heat the sucker rod over the entirety of its length prior to performing some further rod manufacturing or processing step (not shown). Typically, however, sucker rods are uniformly heated prior to passage into an electrostatic spray chamber for purposes of receiving a coat of paint or plastic-like material. It should be appreciated that the subject heating method and apparatus are also readily adapted to other heating applications such as, for example, tempering, hardening, normalizing, and the like.

Continuing with reference to FIG. 1, sucker rod A is constructed from steel or other ferrous material and includes an elongated main or central portion 10 having enlargements 12,14 at the opposite ends thereof. Central portion 10 may be circular, hexagonal, or the like in cross-section and is generally uniform over the entire length. Enlargements 12,14 are similar to each other, and may include beads, flats, and the like to accommodate a particular installation. These details do not, however, comprise a part of the invention and the enlargements have thus been shown schematically for ease of illustration.

The cross-sectional dimension of central portion 10 will normally range between 0.5"–1.125" with a maximum cross-sectional dimension of enlargements 12,14 generally ranging between 1.0"–2.5". The overall length of the rod is approximately 25'–30' with the length of each enlargement 12,14 being relatively small, i.e., typically on the order of magnitude of a few to several inches. Many different types or forms of sucker rods are available and the subject heating method and apparatus are deemed equally applicable with all forms of such rods.

In FIG. 1, induction heating apparatus B is shown as including a multi-turn inductor generally designated 20. The inductor is comprised of a cylindrical copper coil having a plurality of spaced-apart, generally circular loops as is known in the art. The individual coils or loops are hollow to define a continuous fluid passageway therethrough for accommodating a suitable coolant from a source (not shown) disposed adjacent to the overall induction heating apparatus as is also known in the art. The inductor has an entrance end 22 and an exit end 24, with leads 26,28 operatively connecting the coil to a power supply or source 30. While the axial distance between ends 22,24 may vary as necessary or desired, it is typical to have this length be approximately the same as the length of enlargements 12,14. Moreover, power supply 30 preferably comprises an inverter or oscillator, although other types and styles of power supplies having appropriate output capabilities may also be employed. For reasons which will become apparent, it is necessary that the power supply be capable of shifting between at least a pair of predetermined energization levels. Moreover, it is considered highly advantageous for the power supply to be adjustable for accommodating different energization levels as may be required. Potentiometers are conventionally included in power supplies for this purpose.

Feed mechanism C is schematically shown as comprising an elongated pusher shaft 40 suitably retained and supported by a support or base 42. Shaft 40 advantageously includes a pusher head 44 at the forward end thereof for suitable engagement with the terminal end of enlargement 14. The feed mechanism includes an arrangement (not shown) for moving pusher shaft 40 linearly in the direction of arrow a at some predetermined rate for, in turn, moving sucker rod A axially toward and through coil 20. A workpiece support generally designated 46 which may suitably comprise a number of different constructions, including rollers, conveyors, and the like, supports the sucker rod during such movement. The workpiece support is located such that the sucker rod is disposed on and moved along a work- or feedpath which is coaxial with coil 20. Preferably, the rate of movement of pusher rod 40 may be varied to accommodate different feed speeds as may be required for different types and/or styles of workpieces. Various detailed arrangements for the feed mechanism and workpiece support are known in the art and do not, in and of themselves, comprise a part of the present invention.

FIG. 1 also shows an inductor energization level control circuit generally designated 50. This circuit is provided to advantageously function in a manner to be described and includes an inductor power level meter 52 connected across inductor leads 26,28 by leads 54,56, respectively. When coil 20 is energized to any level, meter 52 will detect a certain power level. As sucker rod A is passed into and through coil 20, the power absorbed by the rod during heating will vary as a function of the mass being heated. That is, sucker rod enlargements 12,14 will cause a larger power reading on meter 52 than central portion 10. Moreover, and for any constant mass or load inductively coupled with coil 20, the meter reading will remain substantially constant.

Accordingly, and at a constant feed rate, it is necessary to heat enlargements 12,14 at a higher energization level of coil 20 for purposes of obtaining uniform heating over the entirety of the sucker rod length. Meter 52 thus acts as an automatic sensing device for sensing or indicating when either of enlargements 12,14 is disposed in an inductively coupled relationship with coil 20. Thus, when the absorbed power sensed by meter 52 reaches some predetermined level, it indicates that one of the enlargements is inductively coupled with the coil and that coil energization should be shifted. Such shifting is to the predetermined level required for heating the enlargement to a temperature which will be uniform with the heating of rod main or central portion 10.

To that end, control circuit 50 includes a trigger mechanism generally designated 58 connected with meter 52 by a lead 60. This trigger, in turn, is connected with a timer mechanism 62 by a lead 64 and the timer mechanism is connected with power supply 30 by lead 66. In the arrangement shown, lead 60 carries a direct current signal which is proportional to the absorbed power sensed by meter 52. When the direct current signal reaches some predetermined value, trigger 58 is energized for, in turn, automatically shifting power supply 30 from one level of energization to the other. Timer 62 maintains this other level of energization for some preselected period of time and then causes trigger 58 to be deactivated so that the power supply will return to the original or one energization level. Trigger 58 may comprise any number of different arrangements and a relay comprises an example of one such means.

Timer 62 is adjustable so that the length of time which power supply 30 will be energized to its alternative or other level may be advantageously controlled and/or varied. Typically, and in the preferred embodiment here under discussion, timer 62 is adjusted so that the alternative energization level is maintained until the enlargement 12 or 14 which is inductively coupled with coil 20 has passed entirely therethrough. The specific details and nature of control circuit 50 may be varied as necessary or appropriate to meet particular operating needs and/or parameters. Various other components and cooperative relationships may be suitably employed for practicing the invention; however, such modifications do not in any way depart from the overall intent or scope of the subject concept.

Figure 2:
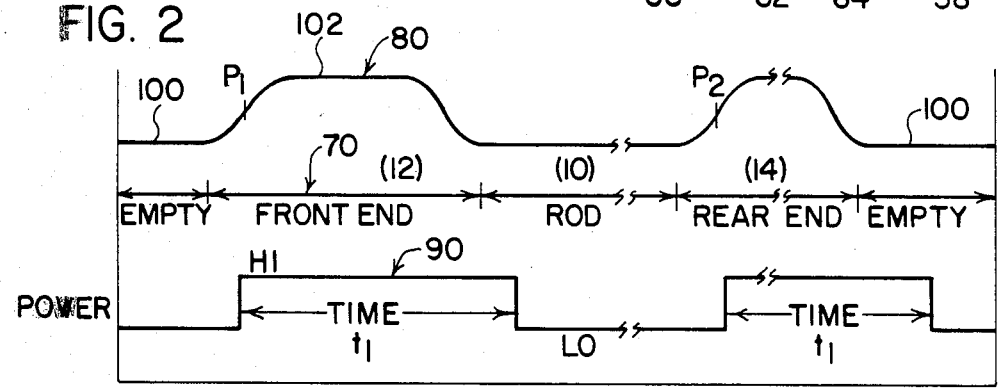
FIG. 2 is a graph showing power absorption of a sucker rod during passage through the induction heating coil of FIG. 1 and shifting of the inductor energization levels in accordance with the invention; and, FIG. 3 is a graph showing the power absorption level and its relationship to the inductor energization level at a predetermined trigger point.

In the structural arrangement shown in FIG. 1, and with additional reference to FIG. 2, power supply 30 is selectively shiftable between first and second energization levels. The first level is employed to inductively heat main or central portion 10 of sucker rod A to some predetermined desired temperature at some preselected feed rate of feed mechanism C. The second level is higher than the first level and is utilized for heating sucker rod enlargements 12,14 at the same feed rate.

FIG. 2 is a graphical representation of the power absorption level and power supply energization level as a sucker rod is inductively heated by the apparatus of FIG. 1. Line 70 designates that portion of sucker rod A which is inductively coupled with coil 20 during a heating cycle. The line generally designated 80 represents the corresponding power absorption level detected by meter 52 during the heating cycle. Finally, line 90 indicates the corresponding energization level of power supply 30.

Power supply 30 is normally maintained at the first or low energization level which is preselected for heating main or central portion 10 which will yield some indicated power absorption level 100 on meter 52 even when coil 20 is empty as shown by the extreme left side of line 70 in FIG. 2. As the rod front end, i.e., enlargement 12, begins its entry into coil 20, the absorption level gradually increases toward an upper level 102. At some predetermined absorption level $P_1$ intermediate levels 100,102, the direct current passing from meter 52 to trigger 58 causes energization of control circuit 50 so that trigger 58 will effect a shift in the power supply from the low to the high level of energization. Such shift is substantially instantaneous and is shown in line 90 of FIG. 2 shortly after enlargement 12 has entered into coil 20. Timer 62 is set so that power supply 30 will remain at its higher level of energization for some predetermined period of time $t_1$ as shown in line 90.

As sucker rod A continues its axial passage through coil 20, enlargement 12 begins to exit from coil exit end 24 so that a section of elongated main or central portion 10 is disposed within the coil. As enlargement 12 exits the coil, the power absorption level sensed by meter 52 is gradually reduced from level 102 since the mass of central portion 10 is less than the mass of the enlargement. Timer 62 is adjusted so that time $t_1$ will expire at a predetermined time so that power supply 30 will be returned to the low energization level for heating sucker rod main or central portion 10. As shown in FIG. 2, time $t_1$ expires shortly after enlargement 12 has exited the coil. Depending on the specific conformation of the enlargement, however, expiration of this time interval may have to be varied somewhat to ensure uniform heating. The power absorption level designated by line 80 in FIG. 2 then remains substantially constant and the energization level of the power supply remains at the low level while the entirety of the sucker rod main or central portion passes through the heating coil.

Thereafter, and as enlargement 14 enters the coil, the absorption level sensed by meter 52 begins to rise back toward level 102. This is due to the increased workpiece mass which is entering an inductively coupled relationship with the coil. At some point $P_2$ therealong, which is identical to $P_1$, meter 52 causes control circuit 50 to again be activated for a time $t_1$ in the same manner previously described. As enlargement 14 advances toward and exits from exit end 24 of the coil, the power absorption level gradually decreases from level 102 toward level 100. In processing the single sucker rod A shown in FIG. 1, the slope between levels 102,100 as enlargement 14 exits the coil may be slightly different from the corresponding slope when heating enlargement 12. However, such difference has no bearing on successful practice of the subject invention as herein described.

Figure 3:
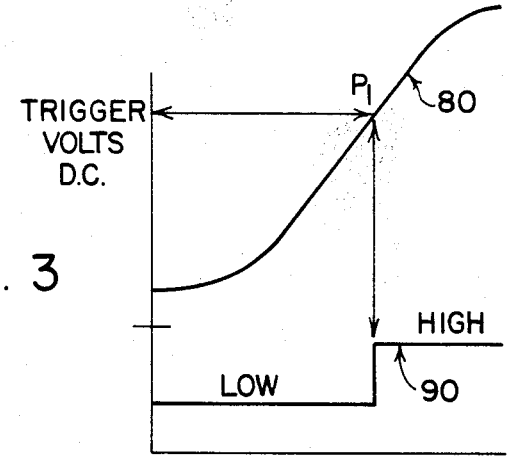

FIG. 3 is a graph of the direct current trigger signal as it relates to power absorption curve 80 and the relationship between curve 80 and coil energization curve 90. As shown, the trigger point is designated $P_1$ and is set to occur at some area along the curve as the power absorption rate increases to a predetermined level. Once this level reaches $P_1$, the control circuit is triggered to shift the power supply in a substantially instantaneous manner from the low to the high energization level.

Although an appropriate control circuit has been schematically shown and described, it will be appreciated that a number of specific, alternative circuit details may be advantageously included to accommodate particular requirements and/or operational circumstances. Use of such alternatives do not, however, in any way depart from the overall intent or scope of the present invention.

The essence of the invention resides in automatically detecting changes in operational parameters of the heating coil so that the coil energization level may be automatically adjusted to obtain uniform heating over the entire length of a workpiece being heated. In addition, and although the invention has been described with reference to uniformly heating an elongated sucker rod, it should be appreciated that the broader aspects of the invention are readily adapted to use with other types and styles of workpieces which include at least one enlargement disposed at some location therealong.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A method for inductively heating an elongated workpiece to a generally uniform temperature over the length thereof wherein said workpiece has a first portion with a uniform cross-section extending over a major part of the workpiece length and a second portion with a cross-section greater than said first portion, said method comprising the steps of:
    (a) providing a multi-turn inductor having an entrance end and an exit end with said inductor being generally coaxially disposed about an elongated workpath and selectively energizable by a controllable power supply to either one of two different preselected energization levels;
    (b) moving at least one of said inductor and workpiece relative to the other at a constant rate along said workpath with consecutive sections of said workpiece and said inductor disposed in an inductively coupled relationship for heating said workpiece;
    (c) energizing said inductor to a first one of said preselected energization levels during said step of moving said inductor and workpiece relative to one another, for inductively heating one of said workpiece first and second portions to generally a preselected temperature as it passes through said inductor;
    (d) sensing the instantaneous electrical power absorbed by the workpiece from said inductor as the other one of said first and second workpiece portions is moved into an inductively coupled relationship therewith to create a first electrical signal proportional to the sensed instantaneous power absorbed from said energized inductor;
    (e) creating a second signal in response to said first signal reaching a predetermined value; and,
    (f) shifting the energization level of said inductor to the other one of said preselected energization levels directly in response to said second signal, and maintaining said inductor energized at said other one of said energization levels for a predetermined time interval, for inductively heating said other one workpiece portion to generally said preselected temperature as it passes through said inductor.

2. The method as defined in claim 1 including the step of returning said inductor to said first level of energization on expiration of said time interval.

3. The method as defined in claim 2 wherein said step of returning said inductor to said first energization level occurs at a preselected position of said workpiece relative to said inductor during the said relative movement thereof along said workpath.

4. The method as defined in claim 1 wherein said step of sensing comprises detecting a preselected change in the power absorption level from said inductor during the said relative movement of said workpiece and inductor along said workpath while disposed in inductively coupled relationship.

5. The method as defined in claim 1 wherein said workpiece includes a said second portion adjacent each end thereof having a greater cross-section than said first portion and wherein said first level of inductor energization is less than said second level, said method further including: a first said sensing step for effecting a first said shifting of the energization level of said inductor from said first to said second level as the said workpiece second portion at the workpiece leading end is disposed in an inductively coupled relationship with said inductor during the said relative movement of said workpiece and inductor along said workpath; a first returning step for returning the energization level of said inductor to said first level after said first sensing step; a second said sensing step for effecting a second said shifting of the energization level of said inductor from said first to said second level as the said workpiece second portion at the workpiece trailing end is disposed in an inductively coupled relationship with said inductor during the said relative movement of said workpiece and inductor along said workpath; and, a second returning step for returning the energization level of said inductor to said first level after said second sensing step.

6. The method as defined in claim 5 wherein said first and second energization level returning steps both occur following predetermined time intervals from said first and second energization level shifting steps, respectively.

7. A method for effecting uniform induction heating of a sucker rod having a substantially uniform cross-section over a major portion of the rod length with a generally similar enlarged portion disposed adjacent each of the opposite rod ends, said method comprising the steps of:
  (a) providing a multi-turn inductor having an entrance end and an exit end with said inductor being coaxially disposed about an elongated workpath and selectively energizable to either one of two different preselected energization levels;
  (b) feeding said rod longitudinally along said workpath toward and through said inductor from said entrance end;
  (c) initially energizing said inductor to a first one of said preselected energization levels adapted to inductively heat the rod major portion to generally a preselected temperature as it passes through said inductor during the said rod feeding step;
  (d) sensing the instantaneous electrical power absorbed by the rod from said inductor as said rod is inductively coupled with said inductor during said rod feeding step;
  (e) creating a first electrical signal proportional to the sensed instantaneous power absorbed by the rod from said energized inductor as said rod passes therethrough;
  (f) creating a second signal in response to said first signal reaching a predetermined value as a first said enlarged rod portion associated with the rod leading end passes into said inductor during said rod feeding step;
  (g) shifting the level of energization of said inductor to a second one of said preselected energization levels higher than said first level directly in response to said second signal, and maintaining said inductor energized at said second one of said energization levels for a predetermined time interval, for inductively heating the said first enlarged rod portion to generally said preselected temperature as it passes through said inductor during said rod feeding step;
  (h) returning said inductor to said first one of said levels of energization at the expiration of said time interval for heating said rod major portion to generally said preselected temperature as it passes through the inductor;
  (i) creating a third electrical signal in response to said first signal again reaching a predetermined value as a second said enlarged rod portion associated with the rod trailing end passes into said inductor during said rod feeding step; and,
  (j) shifting said inductor back to said second one of said levels of energization in response to said third signal for inductively heating the said second enlarged rod portion as it passes through said inductor during said rod feeding step.

8. The method as defined in claim 7 further including the step of returning said inductor to said first level of energization following said step of shifting said inductor back to said second level of energization in response to said third signal.

9. The method as defined in claim 8 wherein the said steps of shifting said inductor to said second one of said energization levels and returning the inductor to said first one of said energization levels are initated at predetermined positions of said rod along said workpath during said rod feeding step.

10. The method as defined in claim 7 wherein the said step of returning the inductor to said first energization level at the expiration of said time interval is initiated at a predetermined position of said rod along said workpath during said rod feeding step.

11. The method as defined in claim 10 wherein said step of returning the inductor to said first energization level is initiated as soon as said first enlarged rod portion has passed entirely through the inductor.

12. Apparatus for inductively heating an elongated workpiece with a multi-turn induction heating coil having an entrance end, an exit end, and an elongated workpiece receiving passageway, said workpiece having at least one enlarged end portion and an elongated body portion having a generally uniform cross-section wherein uniform heating requires heating of said body portion with a first inductor energizing power level at a given workpiece feed rate through said inductor passageway and heating said enlarged end portion with a second inductor energization power level a said feed rate, said apparatus comprising: a controllable power supply connected to said coil and having an output power shiftable between said first and second power levels; means or conveying said workpiece through said inductor passageway at said given rate along a workpath extending in a direction from said entrance end to said exit end; sensing means for creating an electrical signal when the instantaneous power absorbed by the workpiece from said inductor reaches a predetermined level as the enlarged end portion is moved into inductively coupled relation with said inductor; trigger means directly responsive to said signal for shifting the energization level of said inductor from said first level to said second level; and, timer means actuated by said trigger means for thereafter returning the energization level of said inductor from said second level to said first level when said workpiece reaches a preselected position along said feed path.

13. The apparatus as defined in claim 12 wherein said timer means returns the energization level of said inductor from said second level to said first level at a predetermined time after the said shifting of the inductor energization level to said second level.

14. The apparatus as defined in claim 12 wherein said workpiece has two enlarged end portions separated by said body portion with one end portion comprising a leading end and the other end portion comprising a trailing end, said sensing means creating a said signal for actuating said trigger means as each of said workpiece enlarged end portions is separately inductively coupled with said inductor.

15. The apparatus as defined in claim 14 wherein said timer means returns the energization level of said inductor to said first level as soon as each of said workpiece enlarged end portions has separately passed entirely through the inductor.

16. The apparatus as defined in claim 12 wherein said timer means returns the energization level of said inductor to said first level as soon as said workpiece enlarged end portion has passed entirely through the inductor.

* * * * *